Jan. 7, 1947. T. H. WALKER 2,414,075
VEGETABLE SLICER
Filed Sept. 21, 1943 2 Sheets-Sheet 1

INVENTOR.
Theron H. Walker
BY Joseph F. Westall
Atty.

Jan. 7, 1947.　　　　T. H. WALKER　　　　2,414,075
VEGETABLE SLICER
Filed Sept. 21, 1943　　　2 Sheets-Sheet 2

INVENTOR.
Theron H. Walker
BY Joseph F. Westall
Atty.

Patented Jan. 7, 1947

2,414,075

UNITED STATES PATENT OFFICE 2,414,075

VEGETABLE SLICER

Theron H. Walker, Los Angeles, Calif.

Application September 21, 1943, Serial No. 503,176

6 Claims. (Cl. 146—167)

This invention relates to slicers and graters, and more specifically contemplates apparatus for reducing vegetables or other food products to thin strips, gratings, or chips.

It is a general object of my invention to provide a rotating element comprising a container adapted to enclose the food product to be treated and to move it against one or more stationary cutting devices under pressure.

More specifically, it is an object of said invention to provide a device having a series of selectively interchangeable cutting, slicing, or abrading plates, each of different abrading or cutting properties, and each of said plates interchangeably forming the bottom of a relatively non-rotatable hopper, in combination with means to rotate the food product to be treated within the hopper and against the cutting or abrading edges of one of such selected relatively stationary plates, so as to slice, cut, or abrade from the food material being treated portions of predetermined size.

Another object is provision of partitions removably keyed to a rotatable member within a preferably cylindrical relatively non-rotatable hopper, the bottom of which hopper is covered by one of a series of selective relatively non-rotatable cutting, slicing, or abrading plates, said partitions providing a plurality of compartments within said hopper to accommodate, if desired, several different food products to be sliced, cut, comminuted, or abraded at the same time, said partitions also comprising part of the means for rotating the matter to be treated against one of such selective abrading or cutting plates.

Still another important object is provision of slicing or abrading means which may be quickly and easily assembled or disassembled for cleaning, and for interchange of selective cutting or abrading plates.

Further objects and advantages such as rigidity of construction, simplicity of operation, ease of assembly, and economy of manufacture will be obvious to those of skill in the art to which my invention relates from the following description read in the light of the accompanying drawings, in which.

Figure 2:
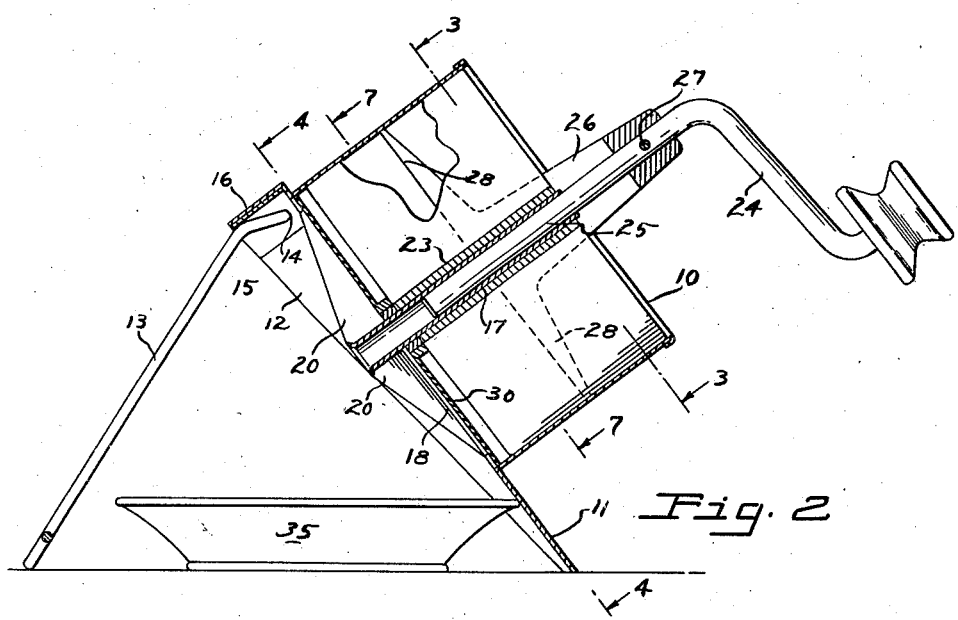
Fig. 2 is a side sectional view taken on lines 2—2 of Fig. 1.
Figure 3:
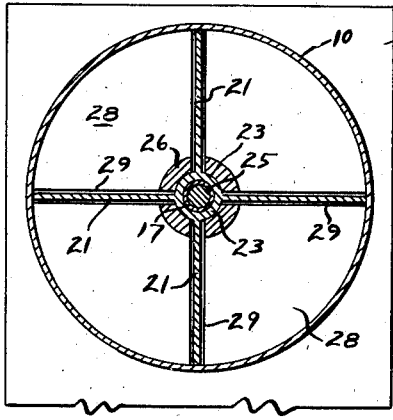
Figure 4:
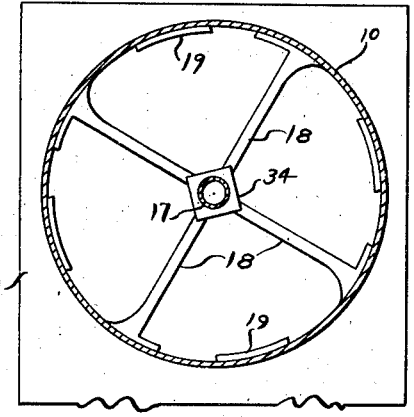
Figure 5:
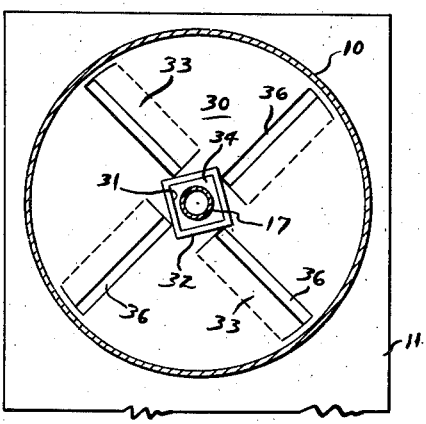
Figure 6:
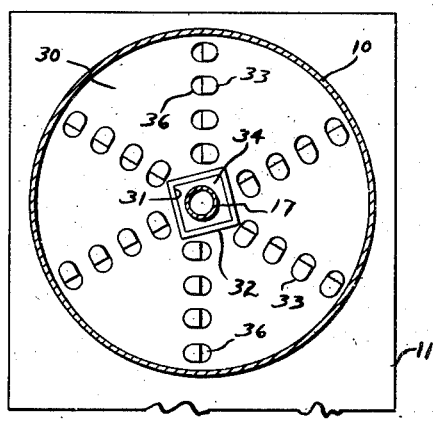
Figure 7:
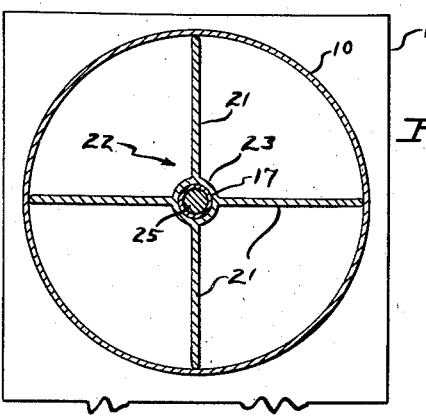

Figs. 3, 4, and 7 are sectional views, taken on correspondingly numbered lines of Fig. 2, with parts of the supporting base in broken-away plan;

Figs. 5 and 6 are, respectively, plan views of two different forms of cutting or abrading plates, the contiguous adjoining part of the hopper-container being shown in section, and broken-away portions of the supporting base being shown in plan.

Referring to the drawings more in detail, in which like numerals indicate similar parts throughout the several views, 10 designates a cylindrical hopper in which the vegetables to be grated are placed. A lower end of hopper 10 is welded or otherwise secured to a rectangular base 11 which extends laterally of the hopper at all sides. Integral flanges 12 extend downwardly at the side edges of base 11, primarily to lend rigidity to the latter. A U-shaped prop 13, having its ends pivoted as at 14 (Fig. 2) in one end of flanges 12 which are disposed at the opposite sides of the base, supports base 11 in operative position at substantially a 45° angle with respect to the table or other support on which the grater-slicer is operated, as is shown in Fig. 2. When the grater-slicer is not in use, prop 13 is swung within the enclosure formed by the flanges 12. Adjacent the point of pivoting 14 of prop 13 in the side flanges of the base, the pivoted reaches 15 of the prop are bent to abut against the top flange 16 of the base when the device is positioned for use so as to limit the outward swing of the prop with respect to the base.

A tubular guide 17 extends through the base co-axially with the cylindrical hopper 10 and is secured to the portion of the base forming the bottom of the hopper, as later explained. To support the cutting and abrading plates, hereinafter described, and to secure tubular guide 17 co-axially within hopper 10 as has been indicated, inside of the lower edge of hopper 10 where secured, as heretofore described, to base 11, said base is cut out (as shown most clearly in Fig. 4) to leave, integral with base 11, two diametric supports 18—18, and to leave also a plurality of peripheral rests 19—19, both supports 18—18 and rests 19—19 being in the plane of the upper surface of base 11. Said cutout portions of base 11 within hopper 10 adjacent diametric supports 18—18 are bent downwardly and shaped to form triangular bracket-braces 20—20 for each of diametric supports 18—18, the inner edge of each of said bracket-braces 20 being soldered or welded to an adjoining lower end of tubular guide 17 to hold said guide in its axial alignment with hopper 10.

Hopper 10 is divided into quadrants by four wings 21 of a winged impeller generally indicated by numeral 22. The wings are integrally secured to and extend radially from a tubular hub 23 which encloses and is adapted to be rotated around tubular guide 17. In this embodiment, the wings 21 are spaced to form right angles therebetween so as to provide four compartments of equal size, in which the matter to be cut or grated is placed. Wings 21 extend laterally to closely adjacent the wall of hopper 10. Rotary movement of the wings 21 is effected by means about to be described so as to move the food products to be treated, disposed between the wings, over the cutting, grating, or slicing plates (later to be described) in a circular motion.

The device for turning the winged impeller 22 comprises a crank 24 having its lower end 25 extending into tubular guide 17.

Figure 1:
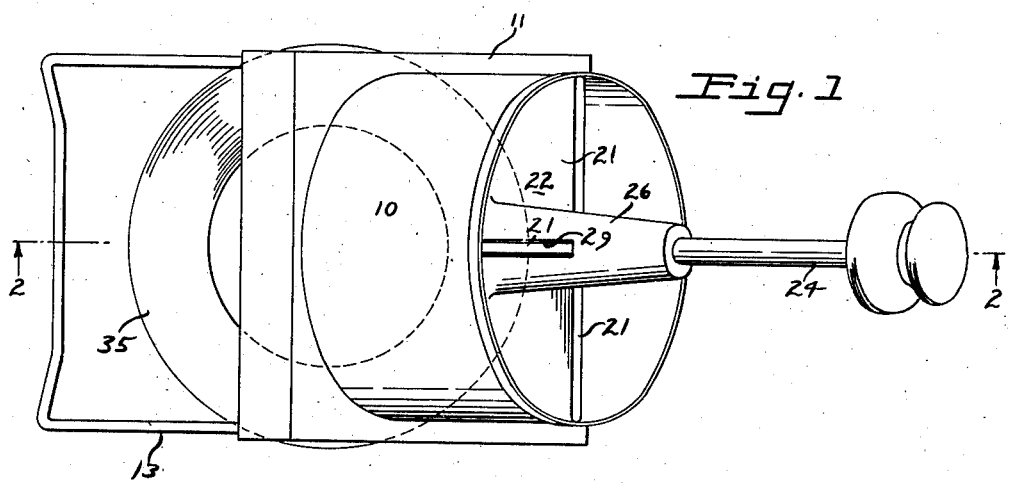
Fig. 1 is a plan view of a preferred embodiment of my device as assembled and arranged for use.

A truncated cone-shaped member 26 is secured by pin 27 on the upper end of the part 25 of crank 24 which rotatably telescopes into the tubular guide 27, said pin 17 extending transversely through the cone-member 26 and crank 24. Cone-member 26 is flared laterally at its lower end, forming an annular pressure plate 28 of a diameter only slightly less than the inside diameter of the hopper 10. With the lower end 25 of crank 24 extending into the tubular-guide 17, the cone-member 26 telescopes over the tubular hub 23 of the winged impeller 22, both pressure-plate 28 and cone-member 26 being slotted as at 29 from the periphery of pressure-plate 28 to adjacent the upper end of the cone-member 26 (as most clearly shown in Figs. 1 and 3); so that cone-member 26 (with the flared lateral extension on its lower end, i. e., pressure-plate 28), may, in telescoping (as heretofore described) over tubular hub 23 of winged impeller 22, receive in and through slots 29 wings 21—21 of impeller 22, thus to removably engage said cone-member 26 and its integral pressure-plate 28 with the crank 24 in order that the said winged impeller 22 may be rotated through the crank-handle.

30 indicates any of a series of selective abrading, slicing, or cutting plates, examples of which are most clearly shown in Figs. 5 and 6. Each of plates 30 are circular in contour and closely, but removably, fit the interior of hopper 10, forming the bottom thereof when assembled for use. Concentric with the center of each plate 30, an opening 31 (preferably rectangular) is formed, said opening being provided at its edges with a rectangular frame 32 extending upward from the surface of plate 30; so that its upper surface is above the cutters or abraders 33 of said plate 30, said upper extension of frame 32 being for the purpose of supporting the impellers 22 and their tubular hub 23 above the cutting or abrading blades of said plate 30. To hold plate 30 non-rotatably as the bottom of hopper 10, a nut 34 is non-rotatably secured to the intersection of supporting members 18 by any means well known in the art, such as welding or soldering, concentric with tubular guide 17 (most clearly shown in Fig. 4); so that when said plate 30 is assembled within hopper 10 in operative position, frame 32 slidingly fits over nut 34 to prevent rotation of plate 30 while food products being treated are revolved against the cutters 33 of plate 30. A suitable receptacle 35 is placed below the hopper to receive the treated food product as it falls through openings 36 of cutting plates 30.

As perhaps will be obvious from the foregoing description, a suitable cutting or abrading plate 30 is selected and placed in the bottom of hopper 10, being supported by diametric supports 18 and peripheral rests 19, and thus forming the bottom of the hopper, frame 32 carried by plate 30 fitting over nut 34, the plate being otherwise held by gravity as the bottom of hopper 10. Tubular hub 23 of impeller 22 is then telescoped over tubular guide 17 within said hopper 10 and rests on nut 34 and rectangular frame 32, thus being spaced above to avoid interference with cutters 33. The four wings 21 of impeller 22 form partitions, thus providing four compartments into which different food products to be treated may be placed. Truncated cone 26 is then telescoped over impeller hub 23, impeller wings 21 passing through slots 29 in pressure-plate 28 and cone member 26, the lower reach 25 of crank 24 coincidentally telescoping within tubular guide 17. Pressure-plate 28 is thus pushed down (or descends by gravity) until it rests on the food product to be treated. The crank 24 is then revolved, which rotates impeller 22, wings 21 thereof rotating the food product in hopper 10, and pressure-plate 28 holding it in contact with the cutting blades or graters, thus treating the product as above described, cuttings or gratings of which pass through openings 36 adjacent each of cutters 33 into the container 35.

It will be noted that the four impeller blades not only function to rotate the food product, but provide four separate compartments, thus permitting four or less different food products to be treated at the same time.

While I have shown but two examples of forms of cutters 33 in Figs. 5 and 6, it will be obvious that different forms of cutters may be provided, and that the number of such cutters may be increased and arranged in other positions, diametric or otherwise, on said plates, than is shown in said figures; and that the relative size of the cutters 33 and corresponding openings of Fig. 6 may be altered; and that instead of the diametric rows of cutters shown in Fig. 6, more or less rows may be used, or they may be arranged in other patterns or arrangements on the various plates. While I have shown four impeller blades 21, and while such impeller blades are illustrated as forming four equal compartments, it will be obvious that more or less impeller blades might be used, and they need not be equi-spaced, as it may be desirable to form mixtures of different proportions. It will also be obvious that other forms of supporting base 10 may be utilized, or that instead of supporting said base on the level surface, the base may be designed to be supported on a wall or other surface—all such obvious variations being within the spirit of my invention as later specifically defined.

While I have illustrated and described but one embodiment of the inventive features of my apparatus, it will be understood that numerous changes in size, design, proportion, and number of the various parts may be made, and in the relative operative angle of the hopper and its cutting plates, a motor-driven shaft may be substituted for the crank, and well-known mechanical means may be utilized to urge the matter to be grated against the knives—all, also, without departing from the spirit of my invention as defined in the appended claims.

What I claim and desire to secure by Letters Patent is:

1. In a device of the character described, a hopper, means at the bottom of said hopper to grate food materials to be treated, an impeller adapted to rotate said food material within said hopper, a crank, and a pressure plate connected to said crank having a slot therein to accommodate said impeller to advance said material into contact with said grating means, and to transmit rotary motion from said crank to said impeller.

2. In a device of the character described, a cylindrical hopper and a supporting base, said hopper being rigidly secured to said supporting base, a tubular guide extending through said base co-axially with said hopper, said tubular guide being secured to the portion of the base forming the bottom of said hopper, said base being cut out to leave a support for a cutting plate, a cutting plate, a winged impeller within said hopper adapted to be rotated within and relative to said hopper, the wings of said impeller dividing the interior of said hopper into compartments, an annular plate engaging and movable axially with respect to said impeller to rotate the latter and to bear against food material to be treated to force food into contact with said cutting plate, and a crank connected to said annular plate to urge the latter downwardly against the food and to rotate the plates so as to impart rotary movement to said impeller.

3. In a device of the character described, a hopper, a cutting plate for food material, means within and at the bottom of said hopper and forming part thereof to support, removably, said cutting plate, an impeller within said hopper dividing said hopper into compartments and adapted to rotate said food material within said hopper, and a separate element movable axially of the hopper within said compartments to advance said food material within said hopper into contact with said cutting plate, and a crank to rotate said impeller and said last-named element, operable further to lower said element against said food material.

4. In a device of the character described, a base, a hopper mounted on said base, a cutting blade having a central opening therein, supported in the bottom of the hopper, a key rigidly connected to said hopper to engage in said opening in the cutting blade to resist rotation of the latter with respect to said hopper, a supporting member for said hopper pivoted to one side of said base adapted to be swung from a position substantially parallel to the base outwardly to support the base and hopper at substantially a 45° angle, a rotary winged impeller within said hopper, a plate within said hopper slotted to accommodate the wings of said impeller and movable axially of said hopper, and a crank connected to said plate to impart pressure thereto and rotary motion to both plate and impeller.

5. In a device of the character described, a base, a cylindrical hopper mounted on said base, a tubular guide extending coaxially through said hopper and secured rigidly thereto, an impeller in said hopper to move food material to be treated against said blade, comprising a tube telescoped over said first-named tubular member and having radial blades connected thereto extending to the wall of said hopper, a crank having one end extending rotatably into said tubular guide, and a slotted annular plate having a hub connected to said crank so as to turn therewith and move axially in said hopper the slots in said plate accommodating the radial blades of said impeller.

6. In a device of the character described, a hopper, means within and at the bottom of said hopper and forming part thereof to support a removable cutting plate for food material within said hopper, an impeller within said hopper having wings dividing said hopper into compartments and adapted to rotate said food material within said hopper, pressure means comprising blades disposed substantially parallel to said cutting plate and between said wings of said impeller, said pressure means being movable axially within said hopper to advance said food material within said hopper into operative contact with said cutting plate, and a crank to rotate said plate and impart corresponding movement to said impeller.

THERON H. WALKER.